(12) United States Patent
Mansell

(10) Patent No.: US 11,139,686 B2
(45) Date of Patent: Oct. 5, 2021

(54) SYSTEM AND METHOD FOR WIRELESS TRANSMISSION OF POWER

(71) Applicant: Richard Marion Mansell, Covington, VA (US)

(72) Inventor: Richard Marion Mansell, Covington, VA (US)

(*) Notice: Subject to any disclaimer, the term of this patent is extended or adjusted under 35 U.S.C. 154(b) by 392 days.

(21) Appl. No.: 15/952,872

(22) Filed: Apr. 13, 2018

(65) Prior Publication Data

US 2018/0301932 A1    Oct. 18, 2018

Related U.S. Application Data

(60) Provisional application No. 62/484,926, filed on Apr. 13, 2017.

(51) Int. Cl.
| | |
|---|---|
| *H02J 50/12* | (2016.01) |
| *H02J 50/05* | (2016.01) |
| *H02J 7/02* | (2016.01) |
| *H01F 38/14* | (2006.01) |
| *H04B 5/00* | (2006.01) |
| *B60L 53/57* | (2019.01) |
| *B60L 53/00* | (2019.01) |

(52) U.S. Cl.
CPC ............. *H02J 50/05* (2016.02); *B60L 53/57* (2019.02); *H01F 38/14* (2013.01); *H02J 7/025* (2013.01); *H04B 5/0012* (2013.01); *H04B 5/0037* (2013.01); *B60L 53/00* (2019.02); *H01F 2038/146* (2013.01)

(58) Field of Classification Search
CPC ........ H02J 50/05; H02J 7/025; H04B 5/0037; H04B 5/0012; H01F 38/14; H01F 2038/146; B60L 53/00
See application file for complete search history.

(56) References Cited

U.S. PATENT DOCUMENTS

| | | |
|---|---|---|
| 645,576 A | 3/1900 | Tesla |
| 649,621 A | 5/1900 | Tesla |

(Continued)

FOREIGN PATENT DOCUMENTS

| | | |
|---|---|---|
| CN | 1 063 004 47 A | 1/2017 |
| CN | 1 070 699 91 A | 8/2017 |

(Continued)

OTHER PUBLICATIONS

Su Choon Chung, "New Methods for Capacitive Wireless Power Transfer," Sep. 2013, 99 pages.

(Continued)

*Primary Examiner* — Adi Amrany
*Assistant Examiner* — Esayas G Yeshaw
(74) *Attorney, Agent, or Firm* — Merchant & Gould P.C.

(57) ABSTRACT

Systems and methods are provided for wireless transmission of power or information. A supplying system include a signal source and a transmitter unit. A consuming system includes an electrical load and a receiver unit. Electrical power or information are transmitted wirelessly from the supplying system to the consuming system. The transmitter unit can include a step up transformer. The receiver unit can include a step down transformer. The transmitter unit and receiver unit are not connected to a common ground, resulting in a truly wireless system for transmitting power or information.

16 Claims, 6 Drawing Sheets

(56) References Cited

U.S. PATENT DOCUMENTS

| | | | |
|---|---|---|---|
| 787,412 A | 4/1905 | Tesla | |
| 8,242,638 B2 * | 8/2012 | Camurati | H02J 17/00 |
| | | | 307/104 |
| 8,476,789 B2 * | 7/2013 | Ichikawa | H02J 7/0044 |
| | | | 307/104 |
| 8,729,859 B2 | 5/2014 | Cook et al. | |
| 9,230,732 B2 | 1/2016 | Muratov et al. | |
| 2010/0013589 A1 * | 1/2010 | Schaffer | H01F 17/0033 |
| | | | 336/200 |
| 2011/0278940 A1 * | 11/2011 | Krishna | C04B 35/462 |
| | | | 307/104 |
| 2012/0181980 A1 * | 7/2012 | Ichikawa | H02J 7/025 |
| | | | 320/108 |
| 2013/0049481 A1 * | 2/2013 | Kudo | G06K 7/0008 |
| | | | 307/104 |
| 2013/0285467 A1 * | 10/2013 | Takahashi | H02J 17/00 |
| | | | 307/104 |
| 2013/0334893 A1 | 12/2013 | Takahashi | |
| 2015/0042172 A1 | 2/2015 | Howard | |
| 2015/0256228 A1 | 9/2015 | Goma et al. | |
| 2015/0266385 A1 | 9/2015 | Lang | |
| 2016/0079773 A1 | 3/2016 | Shinoda | |

FOREIGN PATENT DOCUMENTS

| | | |
|---|---|---|
| EP | 3 046 207 A1 | 7/2018 |
| RU | 2411142 C2 * | 2/2011 |
| WO | 2009 089 146 A1 | 7/2009 |

OTHER PUBLICATIONS

Murata's Technical Magazine Metamorphosis No. 16, "Capacitive Coupling Wireless Power Transmission System," Mar. 26, 2018, 3 pages.

International Search Report and Written Opinion for Application No. PCT/US2018/027476 dated Jul. 9, 2018.

* cited by examiner

SYSTEM AND METHOD FOR WIRELESS TRANSMISSION OF POWER

CROSS REFERENCE TO RELATED APPLICATIONS

This application claims priority to U.S. Provisional Patent Application Ser. No. 62/484,926, filed Apr. 13, 2017, which is hereby incorporated by reference in its entirety.

BACKGROUND

Most systems that transmit power wirelessly utilize inductive charging through coils of wire that are positioned in both a charging station and a receiver unit, often a device or vehicle. An electromagnetic field is generated at the charging station which induces current flow in the receiver unit, which can be used to charge the battery of the associated device or vehicle. A significant drawback of inductive charging is that the receiver unit must be close to the charging station. Other techniques for wirelessly transmitting and receiver power include electromagnetic (e.g. lasers), microwave, and capacitive coupling.

SUMMARY

In general terms, this disclosure is directed to a system and method for wireless transmission of power or information.

One aspect is a wireless transmission system comprising: a wireless transmitter unit comprising: a first transmitter coil configured to receive a source signal; a second transmitter coil arranged within the first transmitter coil and configured to inductively receive a source signal from the first transmitter coil; a capacitive transmitter having a conductive surface electrically connected to the second transmitter coil; and a first capacitive reservoir having a conductive surface electrically connected to the second transmitter coil; and a wireless receiver unit comprising: a first receiver coil configured to be electrically connected to an electrical load; a second receiver coil arranged within the first receiver coil and configured to inductively transmit a source signal to the first receiver coil; a capacitive receiver having a conductive surface electrically connected to the second conducting coil and configured to receive the source signal via capacitive coupling with the capacitive transmitter; and a second capacitive reservoir having a conductive surface electrically connected to the second receiver coil.

Another aspect is a wireless transmission system comprising: a transmitter unit, including: a transmitter primary coil configured to be electrically connected to an alternating current (AC) power source, the transmitter primary conducting coil comprising a first insulated wire wound in concentric circles in a plane; a transmitter secondary conducting coil within the transmitter primary conducting coil configured to inductively receive electrical power from the transmitter primary conducting coil, the transmitter secondary conducting coil comprising a second insulated wire wound in concentric circles in the same plane as the transmitter primary conducting coil and concentric with the transmitter primary conducting coil; a transmitter capacitive surface electrically connected to the transmitter secondary conducting coil; and a transmitter capacitive reservoir surface electrically connected to the transmitter secondary conducting coil; and a receiver, including: a receiver primary coil configured to be electrically connected to an electrical load, the receiver primary conducting coil comprising a first insulated wire wound in concentric circles in a plane; a receiver secondary conducting coil within the receiver primary conducting coil configured to inductively receive transmit a source signal to the receiver primary conducting coil, the receiver secondary conducting coil comprising a second insulated wire wound in concentric circles in the same plane as the receiver primary conducting coil and concentric with the receiver primary conducting coil; a receiver capacitive surface electrically connected to the receiver secondary conducting coil; and a receiver capacitive reservoir surface electrically connected to the receiver secondary conducting coil.

A further aspect is a wireless transmitter unit comprising: a first transmitter coil configured to receive a source signal; a second transmitter coil arranged within the first transmitter coil and configured to inductively receive a source signal from the first transmitter coil; a capacitive transmitter having a conductive surface electrically connected to the second transmitter coil and configured to transmit the source signal via capacitive coupling with the capacitive receiver; and a first capacitive reservoir having a conductive surface electrically connected to the second transmitter coil.

Yet another aspect is a wireless receiver unit comprising: a first receiver coil configured to be electrically connected to an electrical load; a second receiver coil arranged within the first receiver coil and configured to inductively transmit a source signal to the first receiver coil; a capacitive receiver having a conductive surface electrically connected to the second conducting coil and configured to receive the source signal via capacitive coupling with the capacitive transmitter; and a capacitive reservoir having a conductive surface electrically connected to the second receiver coil.

Another aspect is a method of wirelessly transmitting and receiving electrical power or information, the method including: receiving a source signal from an AC source; transforming the source signal to a higher voltage source signal using a step up transformer having a first primary coil electrically connected to the AC source and a first secondary coil; transmitting the higher voltage source signal using a first capacitive surface electrically connected to the secondary coil and a first reservoir capacitive surface electrically connected to the secondary coil; receiving the higher voltage source signal using a second capacitive surface electrically connected to a second secondary coil of a step down transformer and a second reservoir capacitive surface electrically connected to the second secondary coil; and transforming the higher voltage source signal to a lower voltage source signal using the step down transformer having the second secondary coil and a second primary coil electrically connected to an electrical load.

DETAILED DESCRIPTION

Figure 1:
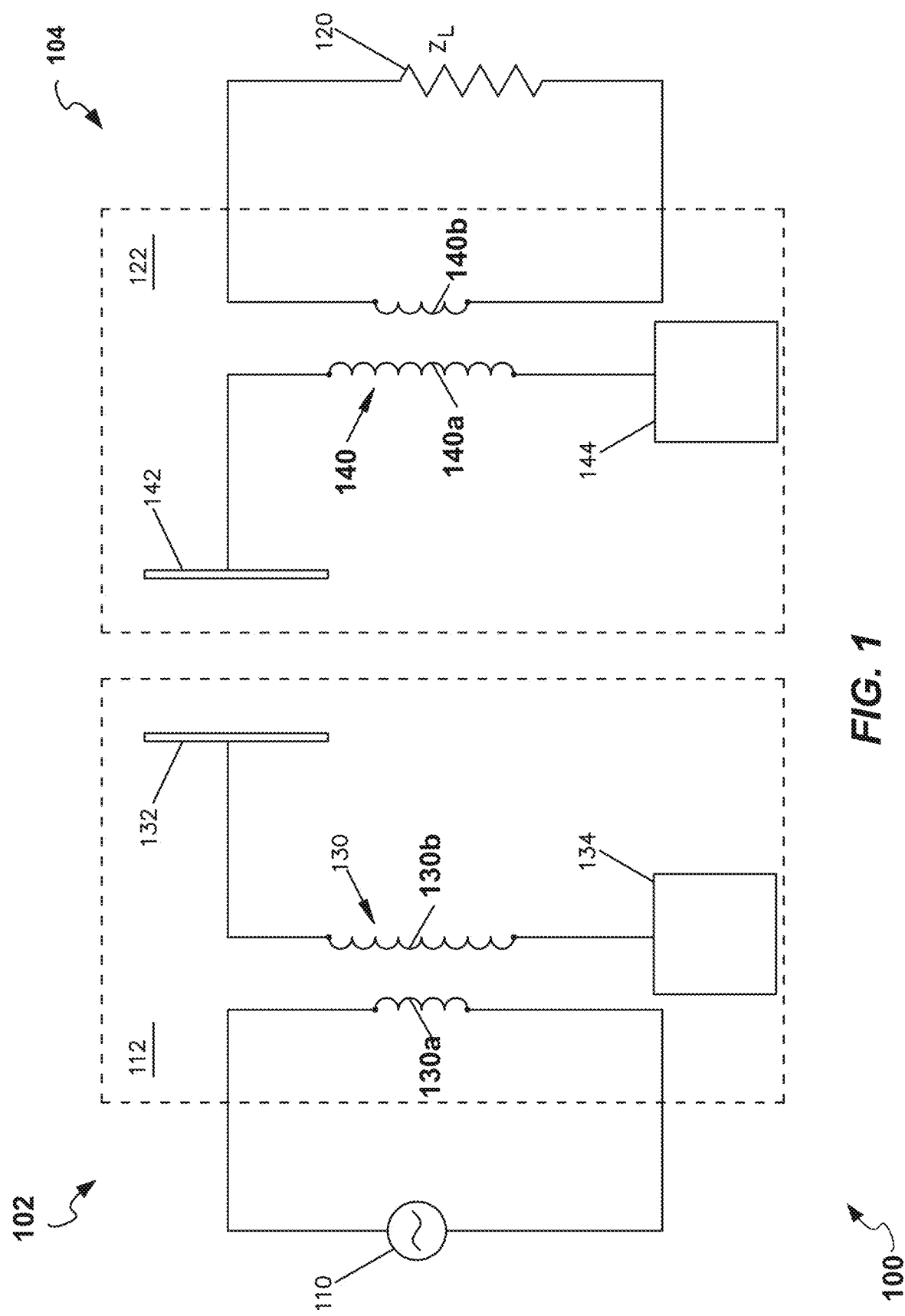
FIG. 1 is a circuit diagram of an example wireless transmission system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, this disclosure is directed to wireless transmission of power or information. In some embodiments, and by non-limiting example, a system and method for wireless transmission of power or information includes a capacitive transmitter and receiver. In some embodiments the systems and methods incorporate step-up and step-down transformers.

FIG. 1 is a circuit diagram of an example wireless transmission system 100. In this example, the wireless transmission system 100 includes a supplying system 102 and a consuming system 104. The example supplying system 102 includes signal source 110, and a transmitter unit 112. In some embodiments, the transmitter unit 112 includes a step up transformer 130 having a lower voltage side 130a and a higher voltage side 130b, a capacitive transmitter 132, and a transmitter capacitive reservoir 134. The example consuming system 104 includes an electrical load 120, and a receiver unit 122. In some embodiments, the receiver unit 122 includes a step down transformer 140 having a lower voltage side 140a and a higher voltage side 140b, a capacitive receiver 142, and a receiver capacitive reservoir 144.

In the example shown, the wireless transmission system 100 transmits electrical power or information wirelessly from the supplying system 102 to the consuming system 104.

In the example shown, the supplying system 102 generates and transmits the electrical power or information using the signal source 110 and the transmitter unit 112. In the example shown, electrical power or information to be transmitted is generated by the signal source 110 as a source signal comprising a periodic electrical signal having one or more frequencies. In some embodiments, the source signal is a sine wave, a sawtooth wave, a square wave, a triangle wave, or a pulsed direct current (DC) signal. In other embodiments, the source signal is an alternating current (AC) signal. In the example shown, the signal source 110 is electrically connected to the transmitter unit 112.

In the example shown, the transmitter unit 112 includes the step up transformer 130, the capacitive transmitter 132, and transmitter capacitive reservoir 134. In some embodiments, the signal source 110 is electrically connected to the lower voltage side 130a of the step up transformer 130. The step up transformer 130 increases the voltage of the source signal. An example embodiment of the step up transformer 130 is discussed below in reference to FIG. 2. In the example shown, one of the terminals on the higher voltage side 130b of the step up transformer 130 is electrically connected to the capacitive transmitter 132, and the capacitive transmitter 132 transmits the stepped up higher voltage source signal.

Capacitive transmitter 132 can be any shape or size to fit a desired application, such as, but not limited to, a sheet, a sphere, a concave shape, a convex shape, shaped to be directional, etc. The size of capacitive transmitter 132 depends on the amount of electrical charge needed to transmit the source signal, and not the transmitter frequency as is the case with a standard radio transmitter. Capacitive transmitter 132 can be formed out of a solid conductive material, or it can be formed from a non-conductive object having at least one conducting surface. Furthermore, the conductive surface of capacitive transmitter 132 can be exposed, or it can be covered or coated with an insulating material, for example, a protective coating. Capacitive transmitter 132 can be a solid, continuous surface, or it may be formed with perforations, slots, and the like. Capacitive transmitter 132 can be made from any material that can hold a charge.

In the example shown, another terminal on the higher voltage side 130b of the step up transformer 130 is electrically connected the transmitter capacitive reservoir 134. The transmitter capacitive reservoir 134 serves as a source of electrical charge for capacitive transmitter 132. The transmitter capacitive reservoir 134 can also be any shape or size to fit a desired application, such as, but not limited to, a sheet, a sphere, a concave shape, a convex shape, shaped to be directional, etc. The size of the transmitter capacitive reservoir 134 depends on the amount of electrical charge needed to transmit the source signal. The transmitter capacitive reservoir 134 can be formed out of a solid conductive material, or it can be formed from a non-conductive object having at least one conducting surface. Furthermore, the conductive surface of transmitter capacitive reservoir 134 can be exposed, or it can be covered or coated with an insulating material, for example, a protective coating. Transmitter capacitive reservoir 134 can be a solid, continuous surface, or it may be formed with perforations, slots, and the like. Transmitter capacitive reservoir 134 can be made from any material that can hold a charge.

The transmitter unit 112 transmits power and/or information by capacitive coupling with the receiver unit 122. In the example shown, the receiver unit 122 includes the step down transformer 140, the capacitive receiver 142, and the receiver capacitive reservoir 144. In the example shown, the capacitive receiver 142 receives the source signal from the capacitive transmitter 132 through capacitive coupling. In some embodiments, in order for the capacitive transmitter 132 and the capacitive receiver 142 to capacitively couple, the receiver unit 122 must be properly matched to the transmitter unit 112, otherwise appreciable capacitive coupling will not occur and power or information will not be appreciably transmitted. Specifically, the step up transformer 130 and the step down transformer 140 should be configured as resonant transformers tuned to the frequency content of the source signal. The efficiency of transfer between the capacitive transmitter 132 and the capacitive receiver 142 depends on the size, shape, orientation, and materials of both the capacitive transmitter 132 and the capacitive receiver 142, as well as the distance from the capacitive transmitter 132 to the capacitive receiver 142. The capacitive transmitter 132 and the capacitive receiver 142 can be different from each other in size and shape, and do not need to match in size, shape, or form in order to capacitively couple.

The capacitive receiver 142 can be any shape or size to fit a desired application, such as, but not limited to, a sheet, a sphere, a concave shape, a convex shape, shaped to be directional, etc. The size of the capacitive receiver 142 depends on the amount of electrical charge needed to receive the source signal, and not the transmitter frequency as is the case with a standard radio transmitter. The capacitive receiver 142 can be formed out of a solid conductive material, or it can be formed from a non-conductive object having at least one conducting surface. Furthermore, the conductive surface of the capacitive receiver 142 can be exposed, or it can be covered or coated with an insulating material, for example, a protective coating. The capacitive receiver 142 can be a solid, continuous surface, or it may be formed with perforations, slots, and the like. The capacitive receiver 142 can be made from any material that can hold a charge.

In the example shown, the capacitive receiver 142 is electrically connected to the higher voltage side 140b of the step down transformer 140. In the example shown, the step down transformer 140 decreases the voltage of the source signal that is received by the capacitive receiver 142. An example embodiment of step down transformer 140 is discussed below in reference to FIG. 2.

In the example shown, the receiver capacitive reservoir 144 is electrically connected to another terminal of the higher voltage side 140b of the step down transformer 140, and serves as a source of electrical charge for the capacitive receiver 142. The receiver capacitive reservoir 144 can be any shape or size to fit a desired application, such as, but not limited to, a sheet, a sphere, a concave shape, a convex shape, shaped to be directional, etc. The size of the receiver capacitive reservoir 144 depends on the amount of electrical charge needed to receiver the source signal. The receiver capacitive reservoir 144 can be formed out of a solid conductive material, or it can be formed from a non-conductive object having at least one conducting surface. Furthermore, the conductive surface of the receiver capacitive reservoir 144 can be exposed, or it can be covered or coated with an insulating material, for example, a protective coating. The receiver capacitive reservoir 144 can be a solid, continuous surface, or it may be formed with perforations, slots, and the like. The receiver capacitive reservoir 144 can be made from any material that can hold a charge.

In some embodiments, the step down transformer 140 reduces the voltage of the source signal received from the capacitive receiver 142 for use by the electrical load 120. In the example shown, the electrical load 120 is connected to the lower voltage side of the step down transformer 140. The electrical load 120 can be anything that can receive or use electrical power or information, including, but not limited to, AC motors, batteries, or direct current (DC) devices connected through a bridge rectifier.

In the example shown, the transmitter unit 112 and the receiver unit 122 are not connected to a common ground. In this way, the transmission of power or information from the supplying system 102 to the consuming system 104 can be truly wireless and truly mobile. In some examples, the capacitive transmitter 132, the transmitter capacitive reservoir 134, the receiver capacitive reservoir 144, and the capacitive receiver 142 are all insulated from ground.

In the example shown, the transmission of power or information is enabled by the capacitive coupling of the capacitive transmitter 132 and the capacitive receiver 142. As such, various materials and objects can be between the capacitive transmitter 132 and the capacitive receiver 142 without affecting the power or information being transmitted. Alternatively, objects need not be between the capacitive transmitter 132 and the capacitive receiver 142, and in some embodiments, power or information though a vacuum between the capacitive transmitter 132 and the capacitive receiver 142. In addition, the distance between the capacitive transmitter 132 and the capacitive receiver 142 can be very large because the capacitive coupling is not limited to the near field. In some embodiments, capacitive transmitter 132 is located near the ground on Earth and the capacitive receiver 142 is located on a satellite or space vehicle beyond the Earth's atmosphere in space. In some embodiments, capacitive transmitter 132 is located near the ground on Earth and the capacitive receiver 142 is located on a satellite or vehicle orbiting the Earth. In still other embodiments, capacitive transmitter 132 is located near the ground on Earth and the capacitive receiver 142 is located on a vehicle within the Earth's atmosphere.

In some embodiments, multiple consuming systems 104 and/or multiple receiver units 122 can receive power from a single supplying system 102 and/or transmitter unit 112. Power from the supplying system 102 and/or transmitter unit 112 will automatically be divided between multiple consuming systems 104 and/or multiple receiver units 122 proportionately to how much power their respective electrical loads 120 draw. In some embodiments, multiple supplying systems 102 and/or transmitter units 112 can be used to power a single consuming system 104 and/or receiver unit 122.

Figure 2:
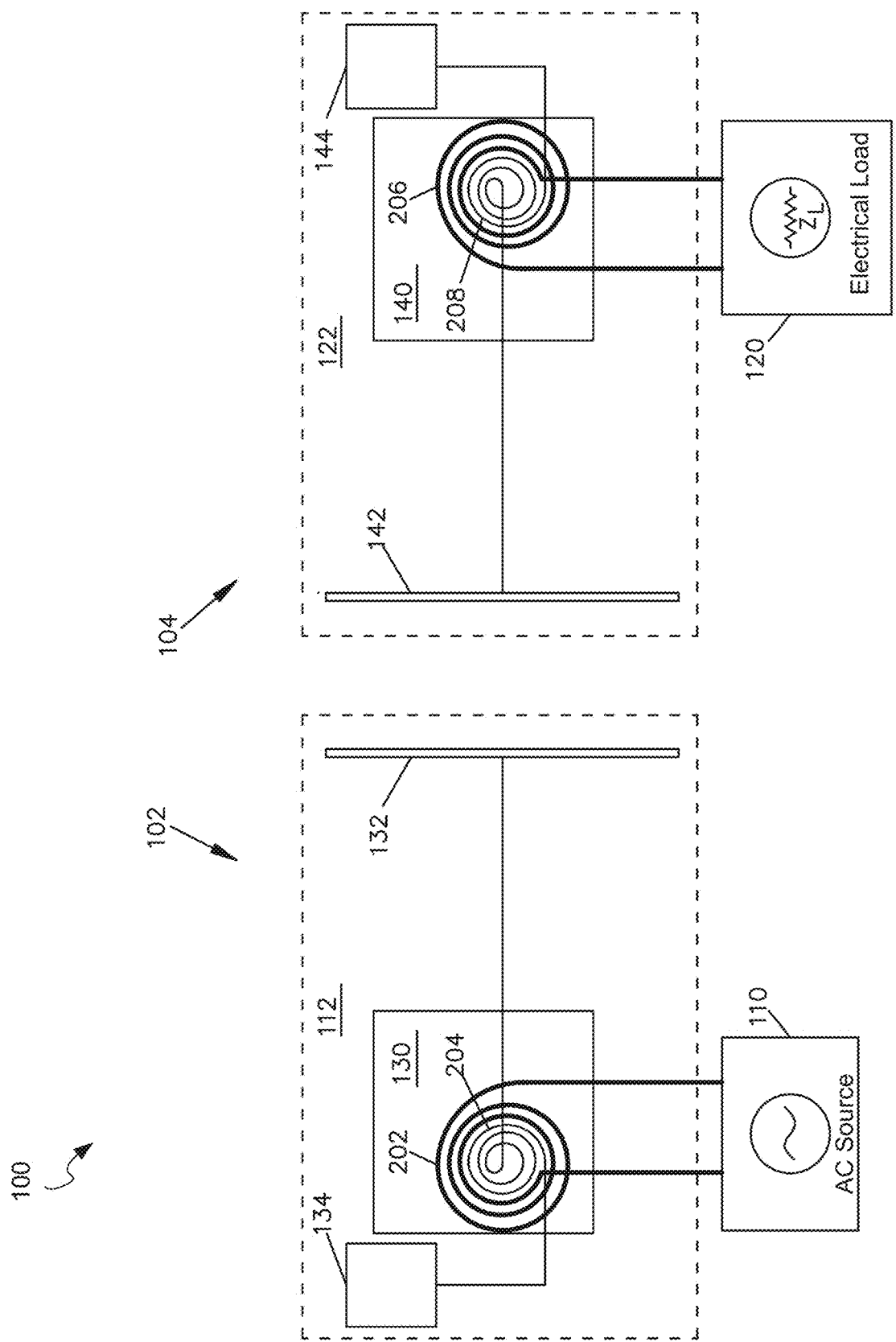
FIG. 2 is a schematic diagram of another example of the wireless transmission system.

FIG. 2 is a schematic diagram of another example of the wireless transmission system 100. In this example, the wireless transmission system 100 includes a supplying system 102 and a consuming system 104 similar to FIG. 1. In the example, additional details of the step up transformer 130 and the step down transformer 140 are shown. In the example shown, the step up transformer 130 includes a transmitter primary coil 202 and a transmitter secondary coil 204, and the step down transformer 140 includes a receiver primary coil 206 and a receiver secondary coil 208. In the example shown, the transmitter primary coil 202 is electrically connected to the signal source 110. In some embodiments, the transmitter primary coil 202 is tightly coupled with the transmitter secondary coil 204 to form a pancake coil transformer. In other embodiments, the transmitter primary coil 202 and the transmitter secondary coil 204 form different types of transformers. In the example shown, the transmitter primary coil 202 has fewer turns than the transmitter secondary coil 204, and the number of turns of the transmitter primary coil depends on the power level of the source signal from the signal source 110. In some embodiments, the transmitter primary coil 202 will have substantially the same mass of conductive material as the transmitter secondary coil 204.

In the example shown, the transmitter secondary coil 204 receives the source signal inductively from the transmitter primary coil 202. In some embodiments, the length of the transmitter secondary coil 204 is chosen based on the desired frequency or frequencies for wireless power or information transmission in conjunction with the source signal frequency or frequencies generated by the signal source 110. In general, the source signal can be any non-zero frequency. In some embodiments, the signal source 110 is configured to provide the source signal having one or more frequencies within a range of frequencies. In some embodiments, the frequency range is from 100 kHz to 500 MHz. In other embodiments, the frequency range is from 1 MHz to 20 MHz. In some embodiments, other source signal frequencies are used. In still other embodiments, the optimal length of the transmitter secondary coil 204 is an even integer multiple fraction of the wavelength associated with the source signal frequency, such as shown in Equation 1 below:

$$L = \lambda/2n; \text{ where } n=2,4,6 \qquad (1)$$

where L is the length of the transmitter secondary coil 204, λ is the wavelength associated with the source signal frequency, and n is an even numbered integer. For example, if the source signal frequency is 5 MHz and the speed of the source signal in the transmitter secondary coil is approximated as 80% of the speed of light, the wavelength λ associated with the source signal is 60 meters. The optimal length L of the transmitter secondary coil 204 in this example would then be 15 meters for n=2, or alternatively 7.5 meters for n=4, etc. In some embodiments, the length of the transmitter secondary coil 204 is greater than or less than length L according to Equation 1. In some embodiments, the length of the transmitter secondary coil 204 is in a range from +/−30% of length L according to Equation 1. In some embodiments, the length of the transmitter secondary coil 204 is in a range from +/−10% of length L according to Equation 1. In some embodiments, the length of the transmitter secondary coil 204 is in a range from +/−5% of length L according to Equation 1. In some embodiments, the length of the transmitter secondary coil 204 is in a range from +/−1% of length L according to Equation 1. In the example shown, one of the terminals of the transmitter secondary coil 204 is electrically connected to the capacitive transmitter 132, and another terminal of the transmitter secondary coil 204 is electrically connected to the transmitter capacitive reservoir 134.

In the example shown, the consuming system 104 includes the step down transformer 140. In some embodiments, the step down transformer 140 includes the receiver primary coil 206 and the receiver secondary coil 208. In the example shown, the receiver primary coil 206 is connected to the electrical load 120. In some embodiments, the receiver primary coil 206 can be tightly coupled with the receiver secondary coil 208, and form a pancake coil transformer similar to that of the step up transformer 130. In other embodiments, the receiver primary coil 206 and the receiver secondary coil 208 form different types of transformers. In the example shown, the receiver primary coil 206 has fewer turns than the receiver secondary coil 208. In some embodiments, the receiver primary coil 206 will have substantially the same mass of conductive material as the receiver secondary coil 208. The length, number of turns, and mass of the receiver primary coil 206 and the receiver secondary coil 208 do not need to match that of the transmitter primary coil 202 and the transmitter secondary coil 204. In the example shown, the length of the receiver secondary coil 208 is an even integer multiple fraction of the wavelength associated with the source signal frequency, such as shown in Equation 1. In some examples, consuming systems 104 that do not have a receiver secondary coil 208 of a length that is an even integer multiple fraction of the wavelength associated with the source signal frequency, such as shown in Equation 1, will have reduced capacitive coupling with supplying systems 102 that have a transmitter secondary coil 204 of a length that is an even integer multiple fraction of the wavelength associated with the source signal frequency, and therefore the transmission of electrical power or information will be reduced.

In the example shown, the receiver secondary coil 208 is electrically connected to the capacitive receiver 142 and the receiver capacitive reservoir 144. In the example shown, the receiver secondary coil 208 receives the transmitted source signal from the capacitive receiver 142. In the example shown, the receiver primary coil 206 inductively receives the source signal from the receiver secondary coil 208, and is electrically connected to the electrical load 120.

Figure 3:
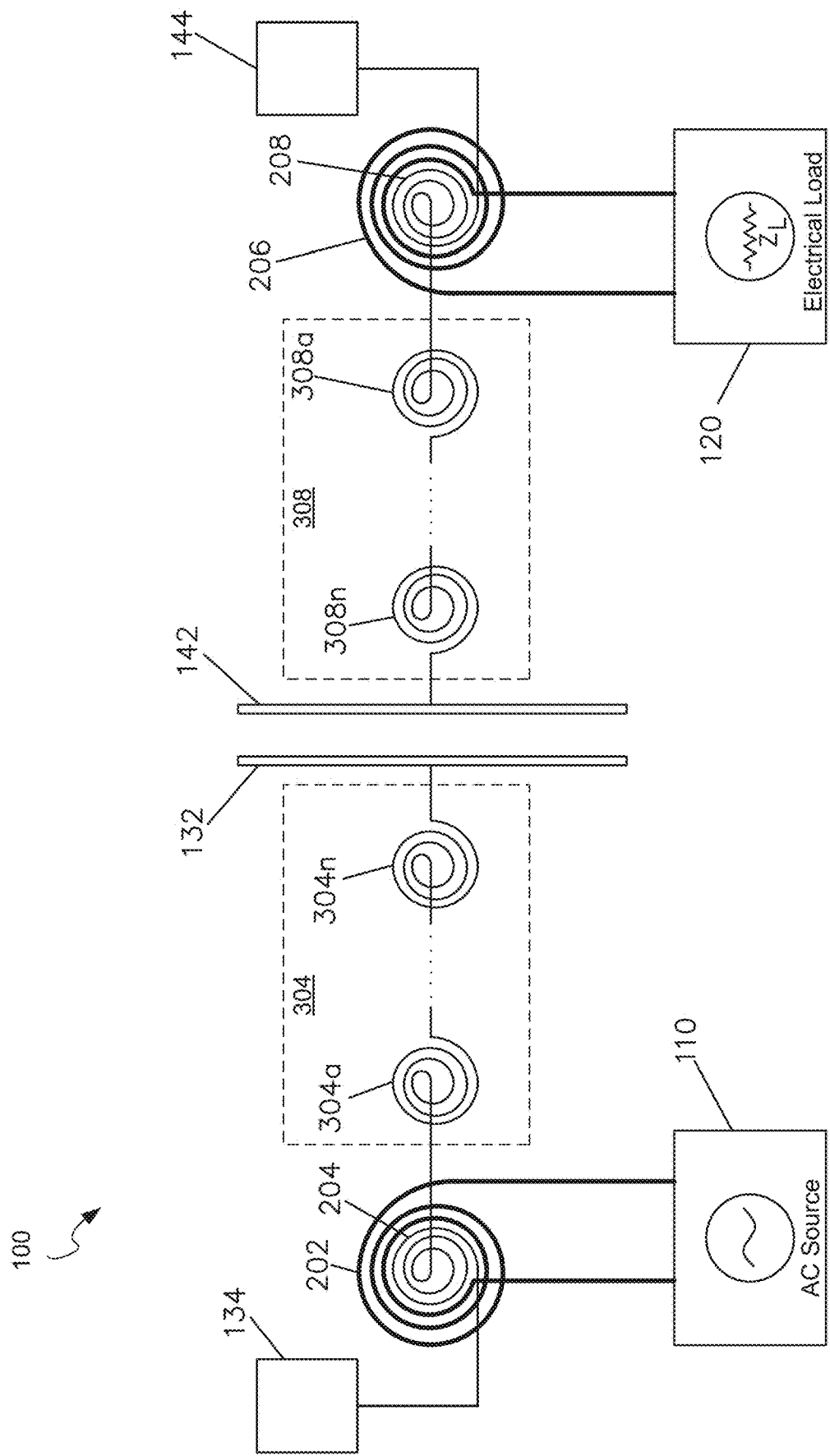
FIG. 3 is a schematic diagram of another example of the wireless transmission system.

FIG. 3 is a schematic diagram of another example of the wireless transmission system 100. In this example, a wireless transmission system 100 includes a supplying system 102 and a consuming system 104 similar to FIG. 2. In the example shown, the supplying system 102 includes a plurality of transmitter extension secondary coils 304*a-n* connected in series. In the example shown, the series of transmitter extension secondary coils 304 is electrically connected to the transmitter secondary coil 204 and the capacitive transmitter 132. In some embodiments, the length of each of the transmitter extension secondary coils 304*a-n* is an even integer multiple fraction of the wavelength associated with the source signal frequency, such as shown in Equation 1. As shown in the example, the transmitter extension secondary coils 304*a-n* can be physically closer to the capacitive transmitter 132 than the transmitter secondary coil 204, and as such the transmitter extension secondary coils 304*a-n* facilitate positioning of the capacitive transmitter 132 further from the signal source 110. In some embodiments, one or more transmitter extension secondary coils 304 are used to improve the transmission of power or information.

In the example shown, the consuming system 104 includes a plurality of receiver extension secondary coils 308*a-n* connected in series. As shown in the example, the series of receiver extension secondary coils 308 are electrically connected to the receiver secondary coil 208 and the capacitive receiver 142. In some embodiments, the length of each of the receiver extension secondary coils 308*a-n* is an even integer multiple fraction of the wavelength associated with the source signal frequency, such as shown in Equation 1. As shown in the example, the receiver extension secondary coils 308*a-n* can be physically closer to the capacitive receiver 142 than the receiver secondary coil 208, and as such the receiver extension secondary coils 308*a-n* facilitate positioning of the capacitive receiver 142 further from the electrical load 120. In some embodiments, one or more receiver extension secondary coils 308 are used to improve the transmission of power or information.

Figure 4:
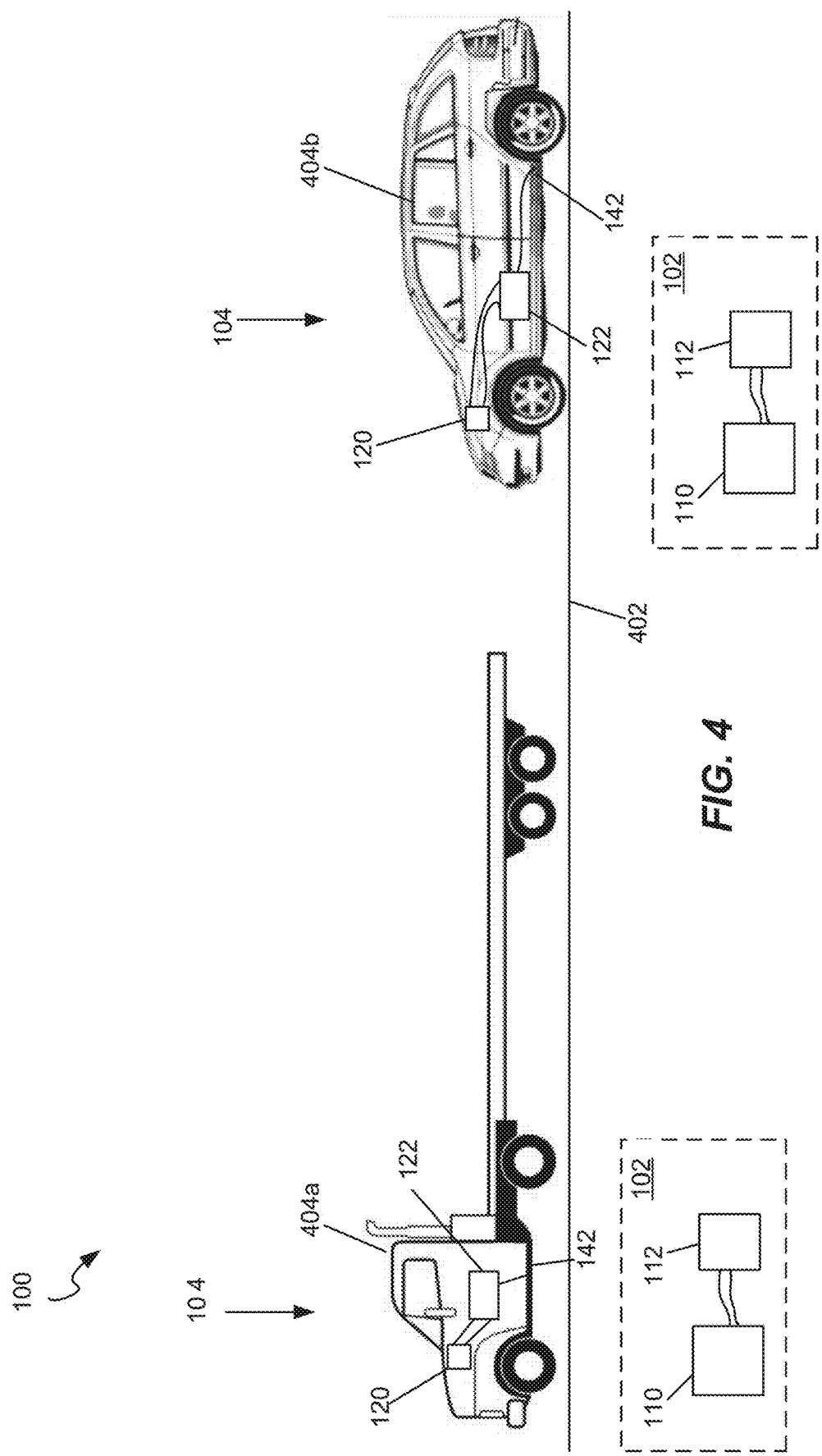
FIG. 4 illustrates an application of an example embodiment of a wireless transmission system.
Figure 5:
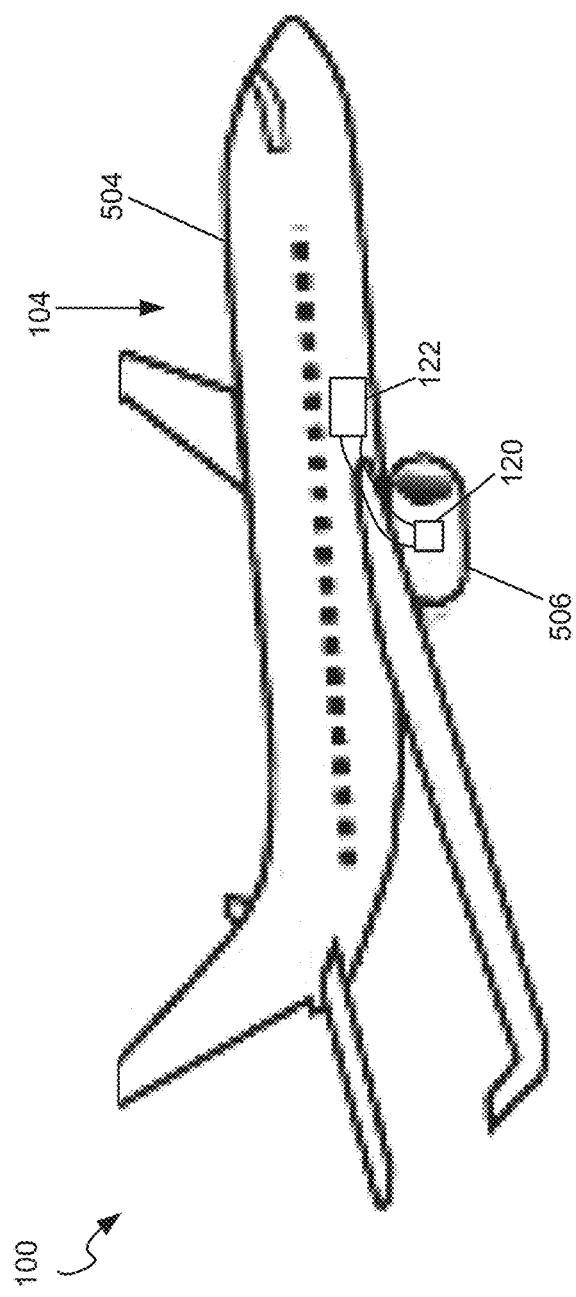
FIG. 5 illustrates another application of an example embodiment of a wireless transmission system.
Figure 5:
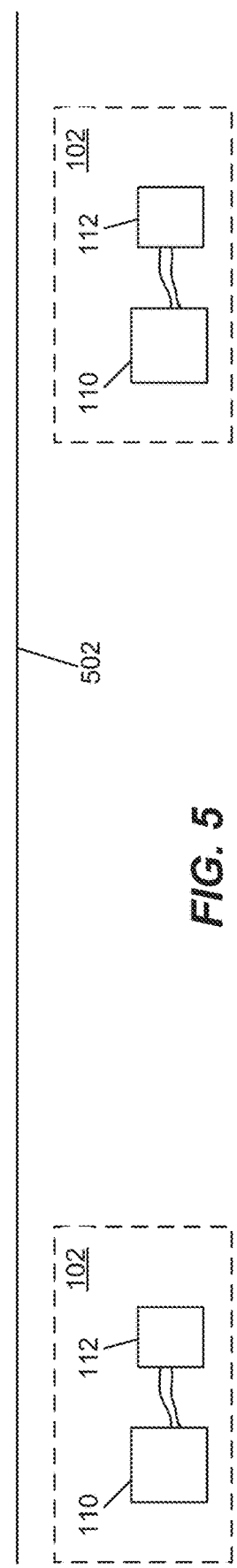
Figure 6:
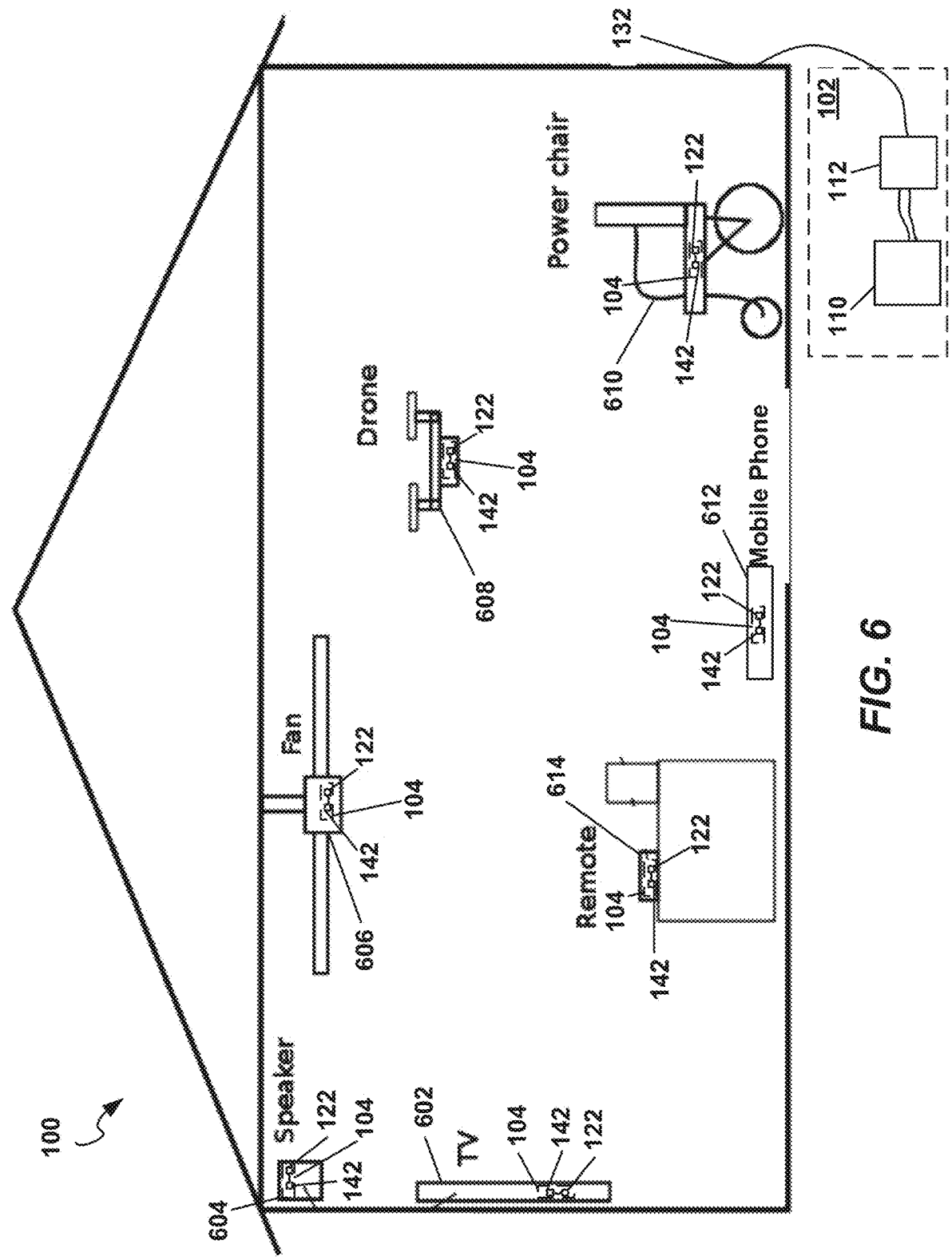
FIG. 6 illustrates another application of an example embodiment of a wireless transmission system.

FIGS. 4-6 illustrate applications of example embodiments of a wireless transmission system 100. In the example shown in FIG. 4, a wireless transmission system 100 includes multiple supplying systems 102 and multiple consuming systems 104. In the example shown, multiple supplying systems 102 and multiple consuming systems 104 are used in the same vicinity without conflict in the transmission of power or information by using different frequencies for the various systems. In the example shown, each supplying system 102 includes a transmitter unit 112 and a signal source 110, and in this example the supplying systems 102 are located near a roadway 402. In the examples shown, each consuming system 104 includes a receiver unit 122 and an electrical load 120, and each receiver unit 122 is attached to a vehicle 404*a-b* with the electrical loads 120 being the vehicles' batteries, such as with an electric car, or the vehicles' motors, or both. As shown in the example, each receiver unit includes a capacitive receiver 142. In some embodiments, the capacitive receivers 142 need not be a specific size or shape and need only be conductive, the capacitive receivers 142 may take almost any form, including that of functional parts an object to which electrical loads 120 are attached. In the example shown, capacitive receivers 142 are shown as the metal frames of the vehicles 404*a-b*. In the example shown, multiple supplying systems 102 and multiple consuming systems 104 are advantageous for applications when a mobile vehicle or device traverse distances that would be impractical to cover with a single supplying system 102, or when large electrical loads 120 need a large amount of power, such as with a railroad locomotive pulling a large load or the like. In some embodiments, the multiple supplying systems 102 and consuming systems 104 can wirelessly transmit and receive power independently by using different source signal frequencies.

FIG. 5 illustrates an application of an example embodiment of a wireless transmission system 100. In this example, the wireless transmission system 100 includes multiple supplying systems 102 located at or near the ground 502 and a consuming system 104 located inside a vehicle such as an airplane 504. As shown in the example, each supplying system 102 includes a transmitter unit 112 and a signal source 110, and the consuming system 104 includes a receiver unit 122 and an electrical load 120. In the example shown the receiver unit 122 is contained in the airplane 504. In some embodiments, the electrical load 120 is a battery providing power to the airplane, or as shown in the example, the electrical load 120 is one or more electric jet engines 506. In the example shown, the distance between a transmitter unit 112 and a receiver unit 122 can be very large because the capacitive coupling is not limited to the near field.

In some current wireless transmission systems such as inductive wireless transmission systems, heat is generated when the transmitter and receiver are moving relative to each other because of an alternating magnetic field in an inductor core, and this heat reduces the efficiency of power transfer. In the example shown, wireless transmission system 100 does not generate appreciable heat when the supplying system 102 and the consuming system 104 are moving relative to one another. In some embodiments, the supplying system 102, transmitter unit 112, or the capacitive transmitter 132 are stationary and the consuming system 104, receiver unit 122, or capacitive receiver 142 are stationary, that is, the supplying system 102, transmitter unit 112, the capacitive transmitter 132, the consuming system 104, receiver unit 122, or capacitive receiver 142 are not moving relative to each other or relative to the Earth. In some embodiments, the supplying system 102, transmitter unit 112, or the capacitive transmitter 132 are stationary and the consuming system 104, receiver unit 122, or capacitive receiver 142 are moving relative to either the supplying system 102, transmitter unit 112, the capacitive transmitter 132, or the Earth. In some embodiments, the supplying system 102, transmitter unit 112, or the capacitive transmitter 132 are moving relative to either the consuming system 104, receiver unit 122, capacitive receiver 142, or the Earth, and the consuming system 104, receiver unit 122, or capacitive receiver 142 are stationary. In still other embodiments, any of the supplying system 102, transmitter unit 112, the capacitive transmitter 132, consuming system 104, receiver unit 122, or capacitive receiver 142 are moving relative to each other or the Earth. In the example shown, the wireless transmission system 100 transmits power or information to objects that consume electrical power or information that are moving. In some embodiments, the wireless transmission system 100 transmits power or information to objects that consume electrical power or information that are static, or not moving.

FIG. 6 illustrates an application of an example embodiment of a wireless transmission system 100. In this example, the wireless transmission system 100 includes a supplying system 102 located underneath a house or building, and multiple consuming systems 104 that are located within objects that consume electrical power or information, such as devices and/or appliances within the house or building. In the example shown, such objects that consume electrical power or information include, but are not limited to, televisions 602, speakers 604, ceiling fans 606, drones 608, powered wheelchairs 610, mobile phones 612, and remote controls 614. In the example shown, the supplying system 102 includes a transmitter unit 112 and a signal source 110. In some embodiments, the transmitter unit 112 includes a capacitive transmitter 132. In the example shown, the metal framing of the house or building serves as the capacitive transmitter 132. As shown in the example, consuming systems 104 include receiver units 122 and capacitive receivers 142. In some embodiments, the capacitive receivers 142 are metal components of the objects that consume electrical power or information.

In some embodiments, encoding schemes can be used to encode information for transmission along with power using wireless transmission system 100. In some embodiments, such encoding scheme includes amplitude modulation (AM), frequency modulation (FM), phase modulation (PM), and the like. Those skilled in the art will recognize that other encoding schemes can be used as well. In some embodiments, information is encoded within the power transmitted. In some embodiments, wireless transmission system 100 can transmit information without transmitting appreciable power.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A wireless transmission system comprising:
a wireless transmitter unit comprising:
a step-up transformer including:
a first transformer coil configured to receive a source signal;
a second transformer coil configured to inductively receive the source signal from the first transformer coil, wherein a length of the second transformer coil is an even integer multiple fraction of a wavelength associated with the source signal, such that the step-up transformer is tuned to resonate at a frequency associated with the source signal; and
wherein the first transformer coil and the second transformer coil are wound to form a first pancake coil;
a capacitive transmitter having a conductive surface electrically connected to the second transformer coil and configured to wirelessly transmit the source signal received from the second transformer coil to a capacitive receiver via capacitive coupling; and
a first capacitive reservoir having a conductive surface electrically connected to the second transformer coil and configured to serve as a source of electrical charge for the capacitive transmitter; and
a wireless receiver unit comprising:
a step-down transformer unit including:
a third transformer coil configured to be electrically connected to an electrical load;
a fourth transformer coil configured to inductively transmit the source signal to the third transformer coil, wherein a length of the fourth transformer coil is an even integer multiple fraction of the wavelength associated with the source signal, such that the step-down transformer is tuned to resonate at the frequency associated with the source signal; and
wherein the third transformer coil and the fourth transformer coil are wound to form a second pancake coil;
the capacitive receiver having a conductive surface electrically connected to the fourth transformer coil and configured to wirelessly receive the source signal via the capacitive coupling with the capacitive transmitter; and
a second capacitive reservoir having a conductive surface electrically connected to the fourth transformer coil and configured to serve as a source of electrical charge for the capacitive receiver; and
wherein the wireless transmitter unit and the wireless receiver unit are free from connection to a common ground.

2. The wireless transmission system of claim 1, wherein the first-transformer coil and the second transformer coil form a tightly wound pancake coil, and wherein the third transformer coil and the fourth transformer coil form a tightly wound pancake coil.

3. The wireless transmission system of claim 1, wherein the first transformer coil is configured to receive a source signal with a frequency that is between 100 kHz and 20 MHz.

4. The wireless transmission system of claim 1, further comprising:
one or more secondary step-up transformer coils electrically connected in series between the second transformer coil and the conductive surface of the capacitive transmitter; and
one or more secondary step-down transformer coils electrically connected in series between the fourth transformer coil and the conductive surface of the capacitive receiver.

5. The wireless transmission system of claim 4, wherein the length of each of the one or more secondary step-up transformer coils is an even integer multiple fraction of the wavelength of the associated source signal, and wherein the length of each of the secondary step-down transformer coils of the one or more secondary step-down transformer coils is an even integer multiple fraction of the wavelength of the associated source signal.

6. The wireless transmission system of claim 5, wherein each of the one or more secondary step-up transformer coils is substantially the same length as the second transformer coil, and wherein each of the one or more secondary step-down transformer coils is substantially the same length as the fourth transformer coil.

7. The wireless transmission system of claim 1, wherein the length and number of turns of the first transformer coil are less than the length and number of turns of second transformer coil, and wherein the length and number of turns of the third transformer coil are less than the length and number of turns of the fourth transformer coil.

8. The wireless transmission system of claim 1, wherein the capacitive transmitter, the first capacitive reservoir, the capacitive receiver, and the second capacitive reservoir are all insulated from ground.

9. The wireless transmission system of claim 1, wherein the capacitive transmitter consists of a non-conductor having a conductive coating, and wherein the capacitive receiver consists of a non-conductor having a conductive coating.

10. The wireless transmission system of claim 1, wherein the number of turns of the second transformer coil is greater than the number of turns of the first transformer coil, and wherein the of number of turns of the fourth transformer coil is greater than the number of turns of the third transformer coil.

11. A wireless transmission system comprising:
a transmitter unit, including:
a step-up transformer primary coil configured to be electrically connected to an alternating current (AC) power source, the step-up transformer primary coil comprising a first insulated wire wound in concentric circles in a plane;
a step-up transformer secondary coil configured to inductively receive electrical power from the step-up transformer primary conducting coil, the step-up transformer secondary coil comprising a second insulated wire wound in concentric circles in the same plane as the step-up transformer primary coil and concentric with the step-up transformer primary coil,
wherein a length of the step-up transformer secondary coil is an even integer multiple fraction of a wavelength associated with a source signal from the AC power source, such that the step-up transformer is tuned to resonate at a frequency associated with the source signal; and
wherein the step-up transformer primary coil and the step-up transformer secondary coil are wound to form a first pancake coil;
a transmitter capacitive surface electrically connected to the step-up transformer secondary coil; and
a transmitter capacitive reservoir surface electrically connected to the step-up transformer secondary coil; and
a receiver, including:
a step-down transformer primary coil configured to be electrically connected to an electrical load, the step-down transformer primary coil comprising a first insulated wire wound in concentric circles in a plane;
a step-down transformer secondary coil configured to inductively transmit a source signal to the step-down transformer primary coil, the step-down transformer secondary coil comprising a second insulated wire wound in concentric circles in the same plane as the step-down transformer primary coil and concentric with the step-down transformer primary coil,
wherein a length of the step-down transformer secondary coil is an even integer multiple fraction of a wavelength associated with the source signal from the AC power source, such that the step-down transformer is tuned to resonate at the frequency associated with the source signal; and
wherein the step-down transformer primary coil and the step-down transformer secondary coil are wound to form a first second coil;
a receiver capacitive surface electrically connected to the step-down transformer secondary coil;
a receiver capacitive reservoir surface electrically connected to the step-down transformer secondary coil; and
wherein the transmitter unit and receiver unit are free from connection to a common ground.

12. A wireless transmitter unit configured to transmit a source signal to a wireless receiver unit, wherein the wireless transmitter unit comprising:
a transformer, including:
a first transformer coil configured to receive the source signal;
a second transformer coil configured to inductively receive a source signal from the first transformer coil, wherein a length of the second transformer coil is an even integer multiple fraction of a wavelength associated with the source signal, such that the transformer is tuned to resonate at a frequency associated with the source signal; and wherein the first transformer coil and the second transformer coil are wound to form a first pancake coil;
a capacitive transmitter having a conductive surface electrically connected to the second transformer coil and configured to transmit the source signal via capacitive coupling with a capacitive receiver;
a capacitive reservoir having a conductive surface electrically connected to the second transformer coil; and
wherein the wireless transmitter unit and the wireless receiver unit are free from connection to a common ground.

13. A wireless receiver unit comprising:
a transformer, including:
  a first transformer coil configured to be electrically connected to an electrical load;
  a second transformer coil configured to inductively transmit a source signal to the first transformer coil, wherein a length of the second transformer coil is an even integer multiple fraction of a wavelength associated with the source signal, such that the transformer is tuned to resonate at a frequency associated with the source signal; and
  wherein the first transformer coil and the second transformer coil are wound to form a first pancake coil;
a capacitive receiver having a conductive surface electrically connected to the second transformer coil and configured to receive the source signal via capacitive coupling with the capacitive transmitter;
a capacitive reservoir having a conductive surface electrically connected to the second transformer coil; and
wherein the wireless transmitter unit and the wireless receiver unit are free from connection to a common ground.

14. A method of wirelessly transmitting and receiving electrical power or information, the method comprising:
receiving a source signal from an AC source;
transforming the source signal to a higher voltage source signal using a step-up transformer having a first primary coil electrically connected to the AC source and a first secondary coil,
  wherein a length of the first secondary coil is an even integer multiple fraction of a wavelength associated with the source signal, such that the step-up transformer is tuned to resonate at a frequency associated with the source signal; and
  wherein the first primary coil and the first secondary transformer coil are wound to form a first pancake coil;
transmitting the higher voltage source signal using a first capacitive surface electrically connected to the first secondary coil and a first reservoir capacitive surface electrically connected to the first secondary coil;
receiving the higher voltage source signal using a second capacitive surface electrically connected to a second secondary coil of a step-down transformer and a second reservoir capacitive surface electrically connected to the second secondary coil;
transforming the higher voltage source signal to a lower voltage source signal using the step-down transformer having the second secondary coil and a second primary coil electrically connected to an electrical load,
  wherein a length of the second secondary coil is an even integer multiple fraction of a wavelength associated with the source signal, such that the step-down transformer is tuned to resonate at a frequency associated with the source signal; and
  wherein the second primary coil and the second secondary coil are wound to form a second pancake coil; and
wherein the first secondary coil and the second secondary coil are free from connection to a common ground.

15. The wireless transmission system of claim 1, wherein the first transformer coil is wound concentrically in a first plane and the second transformer coil is wound concentrically in the first plane within the first transformer coil to form the first pancake coil.

16. The wireless transmission system of claim 1, wherein the third transformer coil is wound concentrically in a second plane and the fourth transformer coil is wound concentrically in the second plane within the fourth transformer coil to form the second pancake coil.

* * * * *